United States Patent
Ogawa

(10) Patent No.: US 9,702,383 B2
(45) Date of Patent: Jul. 11, 2017

(54) ACTUATOR

(71) Applicant: KAYABA INDUSTRY CO., LTD., Minato-ku, Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 280 days.

(21) Appl. No.: 14/407,473

(22) PCT Filed: Aug. 2, 2013

(86) PCT No.: PCT/JP2013/070984
§ 371 (c)(1),
(2) Date: Dec. 12, 2014

(87) PCT Pub. No.: WO2014/027576
PCT Pub. Date: Feb. 20, 2014

(65) Prior Publication Data
US 2015/0184683 A1    Jul. 2, 2015

(30) Foreign Application Priority Data
Aug. 13, 2012  (JP) ................. 2012-179156

(51) Int. Cl.
*F15B 15/16*  (2006.01)
*B61F 5/24*   (2006.01)
(Continued)

(52) U.S. Cl.
CPC .............. *F15B 15/16* (2013.01); *B61F 5/245* (2013.01); *F15B 15/18* (2013.01); *F16F 9/49* (2013.01);
(Continued)

(58) Field of Classification Search
CPC .......... B61F 5/245; F15B 15/16; F15B 15/18; F15B 15/202; F15B 15/204
See application file for complete search history.

(56) References Cited

U.S. PATENT DOCUMENTS

2011/0192157 A1*  8/2011  Ogawa ................... B61F 5/245
                                                  60/469

FOREIGN PATENT DOCUMENTS

DE    EP 2133576 A2 *  12/2009  .............. B61F 5/386
EP       2133576 A2    12/2009
(Continued)

OTHER PUBLICATIONS

International Search Report and Written Opinion mailed Oct. 8, 2013, corresponding to International application No. PCT/JP2013/070984.

*Primary Examiner* — Thomas E Lazo
(74) *Attorney, Agent, or Firm* — Hauptman Ham, LLP

(57) ABSTRACT

An actuator according to the present invention includes a telescopic body, a tank, a first opening/closing valve provided in a first passage that connects a rod side chamber to a piston side chamber, a second opening/closing valve provided in a second passage that connects the piston side chamber to the tank, a pump that supplies a fluid to the rod side chamber, a motor that drives the pump, an exhaust passage that connects the rod side chamber to the tank, and a valve element provided in the exhaust passage, wherein a telescopic unit is formed by integrating the telescopic body, the first opening/closing valve, and the second opening/closing valve, a driving unit is formed by integrating the pump and the motor, and the telescopic unit and the driving unit are provided as separate bodies.

10 Claims, 3 Drawing Sheets

(51) Int. Cl.
    *F16F 9/49* (2006.01)
    *F15B 15/18* (2006.01)
    *F15B 15/20* (2006.01)

(52) U.S. Cl.
    CPC .......... *F15B 15/202* (2013.01); *F15B 15/204* (2013.01); *F15B 2211/3058* (2013.01); *F15B 2211/41581* (2013.01); *F15B 2211/50518* (2013.01); *F15B 2211/513* (2013.01); *F15B 2211/5159* (2013.01); *F15B 2211/7053* (2013.01); *F15B 2215/30* (2013.01)

(56) References Cited

FOREIGN PATENT DOCUMENTS

| | | | |
|---|---|---|---|
| JP | 54-45465 | A | 4/1979 |
| JP | 2002-245904 | A | 8/2002 |
| JP | 2004-169837 | A | 6/2004 |
| JP | 2005-7944 | A | 1/2005 |
| JP | 2006-137294 | A | 6/2006 |
| JP | 2010-65797 | A | 3/2010 |
| JP | 2011-202675 | A | 10/2011 |

\* cited by examiner

ACTUATOR

TECHNICAL FIELD

The present invention relates to an actuator.

BACKGROUND ART

An actuator is used in a railway vehicle, for example, with being interposed between a vehicle body and a truck in order to suppress vibration in a left-right direction relative to an advancing direction of the vehicle body.

JP2010-65797A discloses an actuator including: a telescopic body having a cylinder, a piston inserted into the cylinder to be free to slide, a rod that is inserted into the cylinder and connected to the piston, and a rod side chamber and a piston side chamber defined by the piston within the cylinder; a tank; a first opening/closing valve provided midway in a first passage that connects the rod side chamber to the piston side chamber; a second opening/closing valve provided midway in a second passage that connects the piston side chamber to the tank; a pump that supplies a fluid to the rod side chamber; a motor that drives the pump; an exhaust passage that connects the rod side chamber to the tank; and a variable relief valve provided midway in the exhaust passage.

According to this actuator, a direction of an output thrust is determined by appropriately opening and closing the first opening/closing valve and the second opening/closing valve, whereupon the pump is rotated by the motor at a fixed speed such that the fluid is supplied into the cylinder at a fixed flow rate. Meanwhile, an internal pressure of the cylinder is controlled by adjusting a relief pressure of the variable relief valve, and in so doing, thrust of a desired magnitude can be output in a desired direction.

This type of actuator is used by being interposed between a truck of a railway vehicle and a center pin provided in a lower portion of a vehicle body of the railway vehicle. The actuator suppresses vibration of the vehicle body in a lateral direction relative to an advancing direction of the railway vehicle, and as a result, passenger comfort in the vehicle can be improved.

SUMMARY OF INVENTION

In this type of actuator, the pump and the motor must be disposed and connected in series, while the first, opening/closing valve, the second opening/closing valve, and the variable relief valve are constituted by large solenoid valves and are therefore heavy. Hence, a weight balance is achieved by disposing an integrated unit. including the pump and the motor and an integrated valve unit. including the first opening/closing valve, the second opening/closing valve, and the variable relief valve respectively on a left side and a right, side of the cylinder of the telescopic body so that a moment centering on an axis of the telescopic body does not act on the actuator.

In an actuator having this structure, when a longitudinal direction is set as an axial direction of the telescopic body, a large structure exists in the lateral direction, and it may therefore be difficult to install the actuator in a railway vehicle in which an inter-axle distance of the truck is comparatively narrow, as on conventional railway lines.

An object of the present invention is to provide an actuator that can be installed favorably in a narrow disposal location.

According to one aspect of the present invention, an actuator includes a telescopic body having a cylinder, a piston inserted into the cylinder to be free to slide, a rod that is inserted into the cylinder and connected to the piston, and a rod side chamber and a piston side chamber defined by the piston within the cylinder, a tank, a first opening/closing valve provided in a first passage that connects the rod side chamber to the piston side chamber, a second opening/closing valve provided in a second passage that connects the piston side chamber to the tank, a pump that supplies a working fluid to the rod side chamber, a motor that drives the pump, an exhaust passage that connects the rod side chamber to the tank; and a valve element provided in the exhaust passage, wherein a telescopic unit is formed by integrating the telescopic body, the first opening/closing valve, and the second opening/closing valve, a driving unit is formed by integrating the pump and the motor, and the telescopic unit and the driving unit are provided as separate bodies.

DESCRIPTION OF EMBODIMENTS

An embodiment of the present invention will be described below with reference to the figures.

Figure 1:
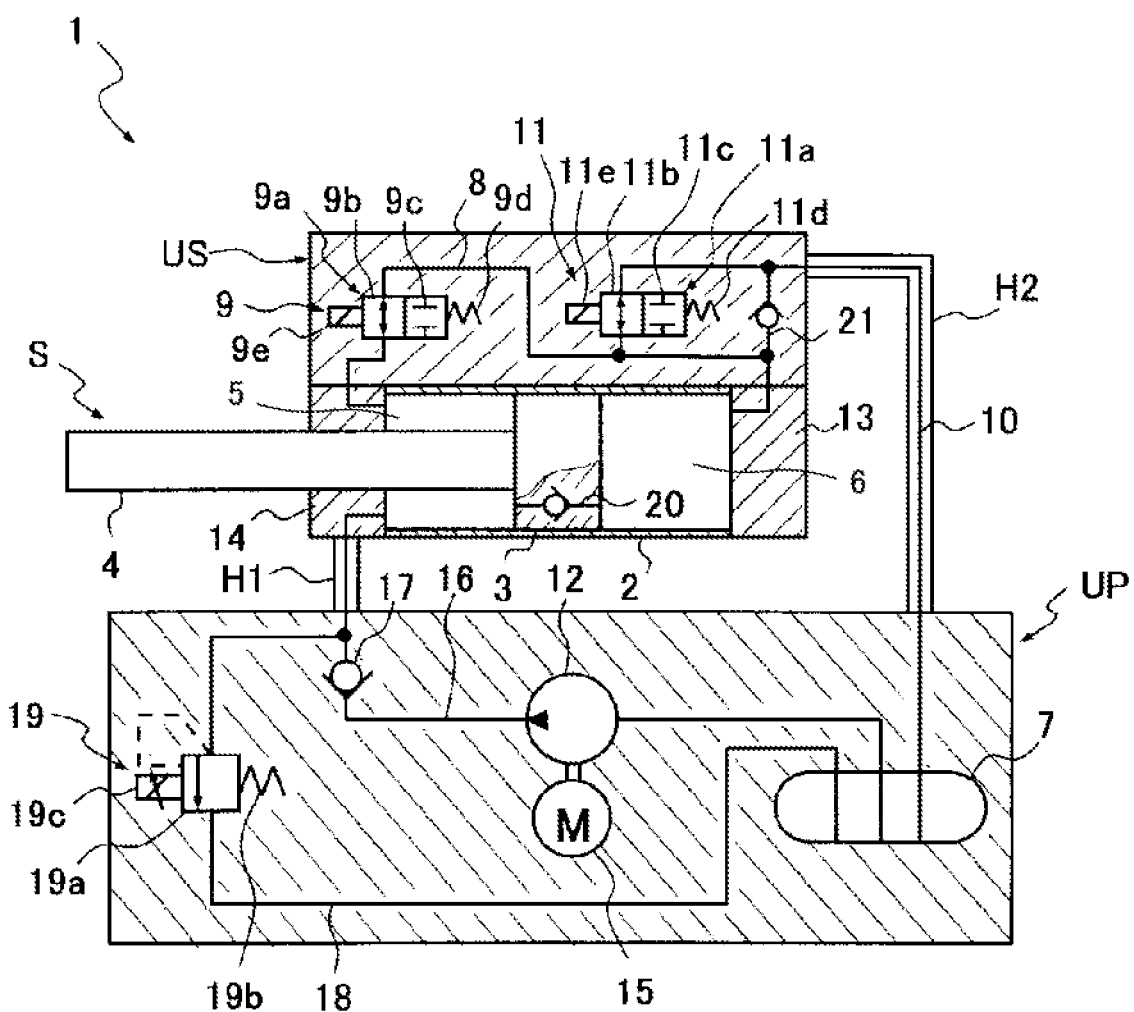
FIG. 1 is a schematic view showing an actuator according to an embodiment.

As shown in FIG. 1, an actuator 1 according to this embodiment includes a telescopic body S. The telescopic body S includes a cylinder 2, a piston 3 inserted into the cylinder 2 to be free to slide, a rod 4 that is inserted into the cylinder 2 and connected to the piston 3, and a rod side chamber 5 and a piston side chamber 6 defined by the piston 3 within the cylinder 2. The actuator 1 is constituted by a single rod type actuator, and further includes a tank 7, a first opening/closing valve 9 provided midway in a first passage 8 that connects the rod side chamber 5 to the piston side chamber 6, a second opening/closing valve 11 provided midway in a second passage 10 that connects the piston side chamber 6 to the tank 7, a pump 12 that supplies a fluid to the rod side chamber 5, a motor 15 that drives the pump 12, an exhaust passage 18 that connects the rod side chamber 5 to the tank 7, and a variable relief valve 19 provided midway in the exhaust passage 18 as a valve element.

In the actuator 1, a telescopic unit US is formed by integrating the telescopic body S, the first opening/closing valve 9, and the second opening/closing valve 11, and a driving unit UP is formed by integrating the pump 12 and the motor 15. The telescopic unit US and the driving unit UP are provided as separate bodies.

A working fluid such as working oil is charged into the rod side chamber 5 and the piston side chamber 6, and a gas is charged into the tank 7 in addition to the working fluid. There is no need to set the tank 7 in a pressurized condition by compressing the gas charged therein.

The telescopic body S is driven to expand by driving the pump 12 using the motor 15 such that the working fluid is supplied into the cylinder 2 in a condition where the first passage 8 is set in a communicative condition by the first opening/closing valve 9 and the second opening/closing valve 11 is closed. Further, the telescopic body S is driven to contract by driving the pump 12 using the motor 15 such that the working fluid is supplied into the cylinder 2 in a condition where the second passage 10 is set in a communicative condition by the second opening/closing valve 11 and the first opening/closing valve 9 is closed.

The respective parts will now be described in detail. The cylinder 2 is formed in a tubular shape. A right end thereof in FIG. 1 is closed by a lid 13, and an annular rod guide 14 is attached to a left end thereof in FIG. 1. Further, the rod 4 inserted into the cylinder 2 to be free to move is inserted into the rod guide 14 to be free to slide. The rod 4 projects to the exterior of the cylinder 2 at one end, and another end is connected to the piston 3 inserted into the cylinder 2 to be free to slide.

A gap between an outer periphery of the rod 4 and the rod guide 14 is sealed by a seal member, not shown in the figures. As a result, the interior of the cylinder 2 is maintained in an airtight condition. As described above, working oil is charged as the working fluid into the rod side chamber 5 and the piston side chamber 6 defined within the cylinder 2 by the piston 3.

In the telescopic body S, a sectional area of the rod 4 is set at half a sectional area of the piston 3 such that a pressure receiving surface area on the rod side chamber 5 side of the piston 3 is half a pressure receiving surface area on the piston side chamber 6 side of the piston 3. Hence, when a pressure in the rod side chamber 5 is set to be identical during expansion driving and contraction driving, an equal thrust is generated during both expansion and contraction, and an identical flow rate is obtained relative to a displacement amount of the telescopic body S on both the expansion and the contraction sides.

To describe this in more detail, when the telescopic body S is driven to expand, the rod side chamber 5 and the piston side chamber 6 communicate with each other such that the pressure in the rod side chamber 5 and a pressure in the piston side chamber 6 are equal. As a result, a thrust obtained by multiplying this pressure by a pressure receiving surface area difference between the rod side chamber 5 side and the piston side chamber 6 side of the piston 3 is generated. When the telescopic body S is driven to contract, on the other hand, communication between the rod side chamber 5 and the piston side chamber 6 is cut off such that the piston side chamber 6 communicates with the tank 7, and therefore a thrust obtained by multiplying the pressure in the rod side chamber 5 by the pressure receiving surface area on the rod side chamber 5 side of the piston 3 is generated. Hence, the thrust generated by the actuator 1 takes a value obtained by multiplying the pressure in the rod side chamber 5 by half the sectional area of the piston 3 during both expansion and contraction. Therefore, the thrust of the actuator 1 can be controlled by adjusting the pressure in the rod side chamber 5 to a target pressure during both expansion driving and contraction driving. The pressure receiving surface area on the rod side chamber 5 side of the piston 3 is set at half the pressure receiving surface area on the piston side chamber 6 side. Therefore, when identical thrust is generated on both the expansion and contraction sides, the pressure in the rod side chamber 5 is identical on both the expansion side and the contraction side, making control simple. Further, in this case, the flow rate relative to the displacement amount is also identical, and therefore an identical response is obtained on both the expansion and contraction sides. It should be noted that even when the pressure receiving surface area on the rod side chamber 5 side of the piston 3 is not set at half the pressure receiving surface area on the piston side chamber 6 side, the thrust can still be controlled on both the expansion and contraction sides of the telescopic body S using the pressure in the rod side chamber 5.

A left end of the rod 4 in FIG. 1 and the lid 13 that closes the right end of the cylinder 2 include attachment portions, not shown in the figures. The actuator 1 can be interposed between a vehicle body and an axle of the vehicle using these attachment portions.

The rod side chamber 5 and the piston side chamber 6 are connected by the first passage 8. The first opening/closing valve 9 is provided midway in the first passage 8. The first passage 8 connects the rod side chamber 5 and the piston side chamber 6 on the exterior of the cylinder 2, but may be provided in the piston 3.

The first opening/closing valve 9 is a solenoid opening/closing valve. The first opening/closing valve 9 includes a valve 9a having a communication position 9b and a cutoff position 9c, a spring 9d that biases the valve 9a to be switched to the cutoff position 9c, and a solenoid 9e which, when energized, switches the valve 9a to the communication position 9b against the spring 9d. When switched to the communication position 9b, the valve 9a of the first opening/closing valve 9 opens the first passage 8 such that the rod side chamber 5 communicates with the piston side chamber 6. When switched to the cutoff position 9c, the valve 9a of the first. opening/closing valve 9 cuts off communication between the rod side chamber 5 and the piston side chamber 6.

The piston side chamber 6 and the tank 7 are connected by the second passage 10, and the second opening/closing valve 11 is provided midway in the second passage 10. The second opening/closing valve 11 is a solenoid opening/closing valve. The second opening/closing valve 11 includes a valve 11a having a communication position 11b and a cutoff position 11c, a spring 11d that biases the valve 11a to be switched to the cutoff position 11c, and a solenoid 11e which, when energized, switches the valve 11a to the communication position 11b against the spring 11d. When switched to the communication position 11b, the valve 11a of the second opening/closing valve 11 opens the second passage 10 such that the piston side chamber 6 communicates with the tank 7. When switched to the cutoff position 11c, the valve 11a of the second opening/closing valve 11 cuts off communication between the piston side chamber 6 and the tank 7.

The pump 12 is driven by the motor 15 to discharge fluid in only one direction. A discharge port of the pump 12 is connected to the rod side chamber 5 by a supply passage 16, while a suction port of the pump 12 communicates with the tank. The pump 12, when driven by the motor 15, suctions working oil from the tank 7 and supplies the working oil to the rod side chamber 5. The motor 15 is driven to rotate upon reception of a current supply from a controller, not shown in the figures. Since the pump 12 discharges fluid in only one direction, as described above, an operation to switch a rotation direction thereof is not required, and therefore a problem in which a discharge amount varies during a rotation switch does not arise. Hence, an inexpensive gear pump or the like can be used as the pump 12. Further, the rotation direction of the pump 12 is always the same direction, and therefore an operation to switch a rotation direction of the motor 15 serving as a drive source that drives the pump 12 is also unnecessary. Hence, the motor 15 does not require a high degree of responsiveness to a rotation direction switch, and therefore a correspondingly inexpensive motor may likewise be used as the motor 15.

A check valve 17 that prevents backflow of the working oil from the rod side chamber 5 to the pump 12 is provided midway in the supply passage 16.

Further, the rod side chamber 5 and the tank 7 are connected via the exhaust passage 18, and the variable relief valve 19 is provided as the valve element midway in the exhaust passage 18.

The variable relief valve 19 includes a valve body 19a provided midway in the exhaust passage 18, a spring 19b that biases the valve body 19a so as to cut off the exhaust passage 18, and a proportional solenoid 19c which, when energized, generates thrust against the spring 19b. A valve opening pressure of the variable relief valve 19 can be adjusted by adjusting a current amount flowing through the proportional solenoid 19c.

The pressure in the rod side chamber 5 upstream of the exhaust passage 18 acts on the valve body 19a of the variable relief valve 19 in a direction for opening the exhaust passage 18. When the pressure in the rod side chamber 5 exceeds a relief pressure, a resultant, force of thrust generated by the pressure and exerted on the valve body 19a and the thrust generated by the proportional solenoid 19c overcomes a biasing force of the spring 19b that biases the valve body 19a in a direction for cutting off the exhaust passage 18. Accordingly, the valve body 19a is caused to retreat, and as a result, the exhaust passage 18 is opened.

Further, in the variable relief valve 19, when the current amount supplied to the proportional solenoid 19c is increased, the thrust generated by the proportional solenoid 19c increases. When the current amount supplied to the proportional solenoid 19c is set at a maximum, the valve opening pressure reaches a minimum, and conversely, when no current at all is supplied to the proportional solenoid 19c, the valve opening pressure reaches a maximum.

When an excessive input is applied to the telescopic body S in an expansion/contraction direction such that the pressure in the rod side chamber 5 exceeds the valve opening pressure, the variable relief valve 19 opens the exhaust passage 18 regardless of the open/closed condition of the first opening/closing valve 9 and the second opening/closing valve 11. Accordingly, the rod side chamber 5 communicates with the tank 7 such that the pressure in the rod side chamber 5 escapes into the tank 7, and as a result, the entire system of the actuator 1 is protected.

The actuator 1 includes the variable relief valve 19, and therefore the thrust of the actuator 1 can be controlled by adjusting the valve opening pressure of the variable relief valve 19 so as to control the pressure in the rod side chamber 5. In other words, by controlling the pressure in the rod side chamber 5 using the variable relief valve 19, control can be performed to determine a thrust. direction using the first opening/closing valve 9 and the second opening/closing valve 11.

For example, in a case where thrust is output in the expansion direction while the telescopic body S expands, the first opening/closing valve 9 is set in the communication position 9b and the second opening/closing valve 11 is set in the cutoff position 11c, whereupon the motor 15 is driven such that working oil is supplied from the pump 12 into the cylinder 2. Together with this operation, the valve opening pressure of the variable relief valve 19 is adjusted by adjusting the current amount of the proportional solenoid 19c so that a value obtained by multiplying the valve opening pressure by the pressure receiving surface area difference between the piston side chamber 6 side and the rod side chamber 5 side of the piston 3 corresponds to the desired thrust.

When the pressure in the rod side chamber 5, which is equal to the pressure in the piston side chamber 6, exceeds the valve opening pressure of the variable relief valve 19, the variable relief valve 19 opens such that the pressure in the piston side chamber 6 and the rod side chamber 5 escapes into the tank 7. Conversely, when the pressure in the rod side chamber 5 falls below the valve opening pressure of the variable relief valve 19, the variable relief valve 19 closes such that the pressure in the piston side chamber 6 and the rod side chamber 5 is increased by the supply of working oil from the pump 12. Hence, the pressure in the piston side chamber 6 and the rod side chamber 5 is adjusted to the valve opening pressure of the variable relief valve 19, and as a result, thrust can be obtained as desired in the expansion direction of the telescopic body S. In other words, by learning a relationship between the current amount applied to the proportional solenoid 190 of the variable relief valve 19 and the valve opening pressure, this control can be performed through open loop control. It should be noted that an energization amount applied to the proportional solenoid 19c may be sensed such that feedback control can be performed using a current loop. Alternatively, feedback control may be performed by sensing the pressure in the rod side chamber 5.

Furthermore, in a case where the telescopic body S is caused to contract by an external force but the desired thrust is to be obtained in the expansion direction against this contraction, the first opening/closing valve 9 is set in the communication position 9b and the second opening/closing valve 11 is set in the cutoff position 11c, similarly to the case where the thrust is obtained in the expansion. direction while the telescopic body S expands, whereupon the motor 15 is driven such that working oil is supplied from the pump 12 into the cylinder 2. In this condition, the desired thrust can be obtained by adjusting the valve opening pressure of the variable relief valve 19. It should be noted that in this case, the telescopic body S does not generate thrust in excess of the external force, and therefore the telescopic body S is caused to function as a damper. Hence, with the telescopic body 5, the desired thrust can be obtained likewise by cutting off the working oil supply from the pump 12 and controlling the valve opening pressure of the variable relief valve 19 with the first opening/closing valve 9 set in the communication position 9b and the second opening/closing valve 11 set in the cutoff position 11c.

In a case where thrust is to be obtained in a contraction direction while the telescopic body S contracts, on the other hand, the first opening/closing valve 9 is set in the cutoff position 9c and the second opening/closing valve 11 is set in the communication position 11b, whereupon the motor 15 is driven such that. working oil is supplied from the pump 12 into the cylinder 2. Together with this operation, the valve opening pressure of the variable relief valve 19 is adjusted by adjusting the current amount. of the proportional solenoid 19c so that a value obtained by multiplying the valve opening pressure by the pressure receiving surface area of the rod side chamber 5 side of the piston 3 corresponds to the desired thrust.

When the pressure in the rod side chamber 5 exceeds the valve opening pressure of the variable relief valve 19, the variable relief valve 19 opens such that. the pressure escapes into the tank 7. Conversely, when the pressure in the rod side chamber 5 falls below the valve opening pressure of the variable relief valve 19, the variable relief valve 19 closes such that the pressure in the rod side chamber 5 is increased by the supply of working oil from the pump 12. Hence, the pressure in the rod side chamber 5 is controlled to the valve opening pressure of the variable relief valve 19, and as a result, thrust can be obtained as desired in the contraction direction of the telescopic body S. It should be noted that since the second opening/closing valve 11 is in the communication position 11b, the piston side chamber 6 is connected to the tank 7, and therefore the contraction operation of the telescopic body S is not impaired.

Furthermore, in a case where the telescopic body S is caused to expand by an external force but the desired thrust is to be obtained in the contraction direction against, this expansion, the first opening/closing valve 9 is set in the cutoff position 9c and the second opening/closing valve 11 is set in the communication position 11b, similarly to the case where thrust is obtained in the contraction direction while the telescopic body S contracts, whereupon the motor 15 is driven such that working oil is supplied from the pump 12 into the cylinder 2. In this condition, the desired thrust can be obtained by adjusting the valve opening pressure of the variable relief valve 19. It should be noted that in this case, the telescopic body S does not generate thrust in excess of the external force, and therefore the telescopic body S is caused to function as a damper. Hence, with the telescopic body 5, the desired thrust can be obtained likewise by cutting off the working oil supply from the pump 12 and controlling the valve opening pressure of the variable relief valve 19 with the first opening/closing valve 9 set in the cutoff position 9c and the second opening/closing valve 11 set in the communication position 11b.

Thus, in the actuator 1, the variable relief valve 19 is provided midway in the exhaust passage 18 that connects the rod side chamber 5 to the tank 7, and therefore the thrust can be controlled by controlling the valve opening pressure of the variable relief valve 19. It should be noted that a valve other than a variable relief valve may be used as the valve element. For example, when a passive valve having a predetermined pressure flow rate characteristic is used as the valve element, the pressure in the rod side chamber 5 on the upstream side is determined by a flow rate of the fluid passing through the passive valve. In this case, a discharge flow rate of the pump 12 may be adjusted while controlling switching of the first opening/closing valve 9 and the second opening/closing valve 11 in a similar manner to that described above, depending on the direction in which the thrust is to be output by the telescopic body S. In so doing, the flow rate of the fluid passing through the passive valve can be adjusted, and as a result, the thrust of the actuator 1 can be controlled as desired. Further, when a simple relief valve is used as the valve element, and thrust is to be output from the telescopic body S in the expansion direction, the pressure in the rod side chamber 5 can be adjusted by opening and closing the second opening/closing valve 11 while maintaining the first opening/closing valve 9 in an open condition, and as a result, the desired expansion direction thrust can be obtained. Conversely, when thrust is to be output from the telescopic body S in the contraction direction, the pressure in the rod side chamber 5 can be adjusted by opening and closing the first opening/closing valve 9 while maintaining the second opening/closing valve 11 in an open condition, and as a result, the desired expansion direction thrust can be obtained. As described above, various valves can be used as the valve element, and the thrust of the actuator 1 can be controlled in accordance with the employed valve.

The actuator 1 according to this embodiment is further provided with a rectifying passage 20 and a suction passage 21. Accordingly, when the telescopic body S is forcibly caused to expand or contract by an external force in a condition where driving of the pump 12 is stopped with both the first opening/closing valve 9 and the second opening/closing valve 11 set in their respective cutoff positions 9c, 11c such that the working oil is pushed out of the cylinder 2 by the expansion/contraction of the telescopic body S and discharged into the tank 7 through the variable relief valve 19 serving as the valve element, leading to a working oil deficiency in the cylinder 2, working oil is supplied into the cylinder 2 from the tank 7 through the suction passage 21. The actuator 1 according to this embodiment can therefore also function as a passive damper that generates a damping force corresponding to a pressure loss in the variable relief valve 19. In other words, the actuator 1 can exhibit a passive damper function as a failsafe when the pump 12 is stopped while the first opening/closing valve 9 and the second opening/closing valve 11 are in their respective cutoff positions 9c, 11c, and as a result, an expansion/contraction failure does not occur.

Figure 2:
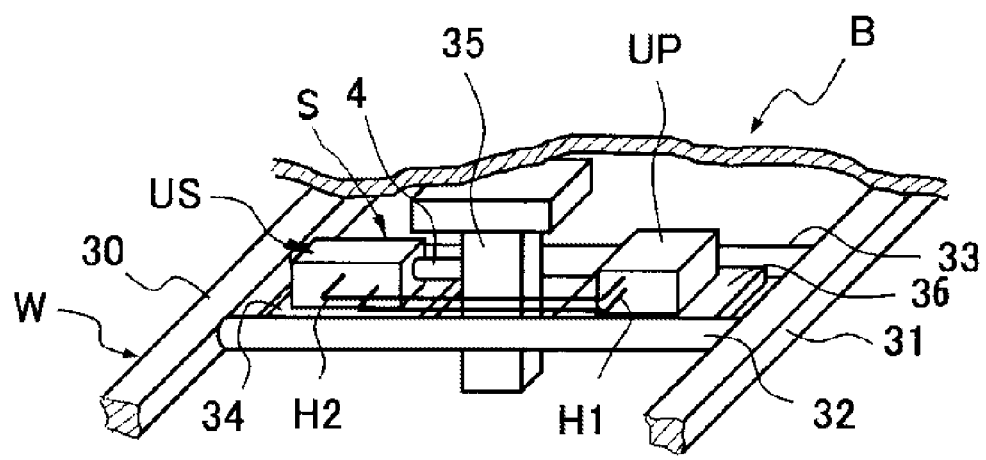
FIG. 2 is a view showing an example in which the actuator according to this embodiment is installed in a railway vehicle.

In the actuator 1 according to this embodiment, as described above, the telescopic unit US is formed by integrating the telescopic body S, the first opening/closing valve 9, and the second opening/closing valve 11, the driving unit UP is formed by integrating the pump 12, the motor 15, the variable relief valve 19, the check valve 17, and the tank 7, and the telescopic unit US and the driving unit UP are provided as separate bodies. As shown in FIGS. 1 and 2, the telescopic unit US and the driving unit UP are connected by a pipe H1 forming a part of the supply passage 16 and a pipe H2 forming a part of the second passage 10 so that the working oil can be supplied from the pump 12 to the cylinder 2 and discharged from the cylinder 2 into the tank 7.

In this case, the tank 7 may be excluded from the driving unit. UP and provided on the telescopic unit US side. Further, the variable relief valve 19 may be excluded from the driving unit UP and provided on the telescopic unit US side.

When the actuator 1 according to this embodiment is installed in a railway vehicle, as shown in FIG. 2, the telescopic unit US is interposed between a truck W and a vehicle body B by connecting one end of the telescopic body S of the telescopic unit. US to an actuator holding portion 34, which is laid between a pair of transverse beams 32, 33 connecting a pair of side beams 30, 31 that hold vehicle wheels, not shown in the figure, of the truck W, and connecting another end of the telescopic body S of the telescopic unit. US to a center pin 35 fixed to a lower end of the vehicle body B. The driving unit UP is fixed to a disposal portion 36 laid between the transverse beams 32, 33 on an opposite side relative to the telescopic unit US across the center pin 35. It should be noted that as long as the driving unit UP is disposed on the opposite side relative to the telescopic body S across the center pin 35, the driving unit UP may be fixed to the lower end of the vehicle body B.

The driving unit UP is disposed on the opposite side relative to the telescopic body S across the center pin 35 such that the driving unit UP and the telescopic unit US are not parallel, and therefore the actuator 1 can be installed easily even in a railway vehicle in which the inter-axle distance of the truck W is comparatively narrow, such as a railway vehicle used on conventional railway lines. As described above, with the actuator 1 according to this embodiment, the driving unit UP and the telescopic unit US are separated into separate bodies, and therefore the driving unit UP and the telescopic unit. US can be attached in separate disposal locations. The actuator 1 can therefore be installed easily even in a narrow disposal location, and as a result, the actuator 1 can be installed favorably.

Figure 3:
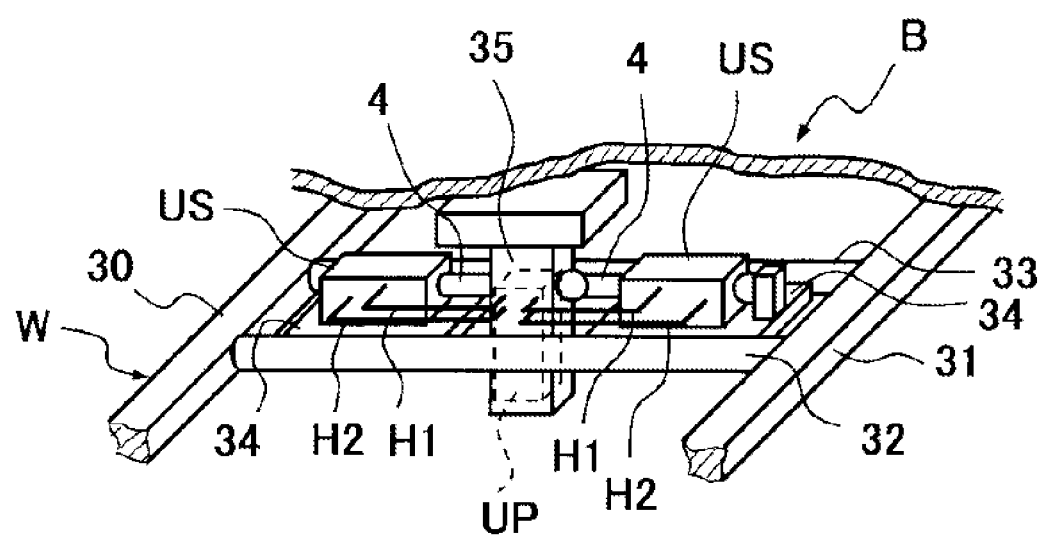
FIG. 3 is a view showing another example in which the actuator according to this embodiment is installed in a railway vehicle.

Further, a plurality of telescopic units US may be driven by a single driving unit UP. In this case, as shown in FIG. 3, for example, the telescopic body S of one telescopic unit US is connected to one of two actuator holding portions 34 provided on the truck W, and the other end of the telescopic body S of this telescopic unit US is connected to one side of the center pin 35. The telescopic body S of another telescopic unit US is connected to the other of the two actuator holding portions 34 provided on the truck W, and the other end of the telescopic body S of this telescopic unit US is connected to the other side of the center pin 35. The driving unit UP may be attached to any position that does not obstruct the telescopic units US, and since an interior of the center pin 35 is a cavity, the driving unit UP may be housed inside the center pin 35, for example. Hence, the plurality of telescopic units US may be driven by the single driving unit UP by supplying working oil from the single driving unit UP to the two or more telescopic units US. Further, by providing the variable relief valve 19 serving as the valve element on the driving unit UP side in this case, the variable relief valve 19 serving as the valve element need not be provided for both of the telescopic units US, and therefore an overall size of the actuator 1 can be reduced, thereby facilitating installation of the actuator 1 even further. It should be noted that fluid is supplied to only one of the telescopic units US likewise when the driving unit UP is housed in the center pin 35.

Embodiments of this invention were described above, but the above embodiments are merely examples of applications of this invention, and the technical scope of this invention is not limited to the specific constitutions of the above embodiments.

This application claims priority based on Japanese Patent Application No 2012-179156 filed with the Japan Patent Office on Aug. 13, 2012, the entire contents of which are incorporated into this specification.

The invention claimed is:

1. An actuator, comprising:
    a telescopic body having a cylinder;
    a piston inserted into the cylinder to be free to slide;
    a rod that is inserted into the cylinder and connected to the piston;
    a rod side chamber and a piston side chamber defined by the piston within the cylinder;
    a tank;
    a first opening/closing valve provided in a first passage that connects the rod side chamber to the piston side chamber;
    a second opening/closing valve provided in a second passage that connects the piston side chamber to the tank;
    a pump that supplies a working fluid to the rod side chamber;
    a supply passage via which the working fluid is supplied from the pump to the rod side chamber;
    a motor that drives the pump;
    an exhaust passage diverging from the supply passage so as to connect the rod side chamber to the tank; and
    a valve element provided in the exhaust passage,
    wherein
    a telescopic unit is formed by integrating the telescopic body, the first opening/closing valve, and the second opening/closing valve,
    a driving unit is formed by integrating the pump and the motor,
    the telescopic unit and the driving unit are provided as separate bodies, and
    the telescopic unit and the driving unit are mutually connected by (i) a first pipe forming a part of the supply passage and (ii) a second pipe forming a part of the second passage.

2. The actuator as defined in claim 1, wherein the telescopic unit is provided in a plurality, and
    the working fluid discharged from the pump of the single driving unit is supplied to the respective rod side chambers of the plurality of telescopic units.

3. The actuator as defined in claim 1, wherein the driving unit is formed by further integrating the valve element.

4. The actuator as defined in claim 1, wherein the telescopic body of the telescopic unit is interposed between a truck of a railway vehicle and a center pin provided on a vehicle body, and
    the driving unit is disposed on an opposite side relative to the telescopic body across the center pin.

5. The actuator as defined in claim 1, wherein the telescopic body of the telescopic unit is interposed between a truck of a railway vehicle and a center pin provided on a vehicle body, and
    the driving unit is housed in the center pin.

6. The actuator as defined in claim 1, further comprising:
    a suction passage that allows the working fluid to flow only from the tank toward the piston side chamber; and
    a rectifying passage that allows the working fluid to flow only from the piston side chamber toward the rod side chamber.

7. The actuator as defined in claim 1, wherein
    the separate bodies include
        a first body provided as the telescopic unit and integrating therein the telescopic body, the first opening/closing valve, and the second opening/closing valve, and
        a second body provided as the driving unit and integrating therein the pump and the motor, and
    the first pipe and the second pipe extend between an outer wall of the first body and an outer wall of the second body.

8. The actuator as defined in claim 1, wherein the telescopic unit integrates therein the tank.

9. An actuator, comprising:
    a telescopic body having a cylinder, a piston inserted into the cylinder to be free to slide, a rod that is inserted into the cylinder and connected to the piston, and a rod side chamber and a piston side chamber defined by the piston within the cylinder;
    a tank;
    a first opening/closing valve provided in a first passage that connects the rod side chamber to the piston side chamber;
    a second opening/closing valve provided in a second passage that connects the piston side chamber to the tank;
    a pump that supplies a working fluid to the rod side chamber;
    a motor that drives the pump;
    an exhaust passage that connects the rod side chamber to the tank; and
    a valve element provided in the exhaust passage,
    wherein
    a telescopic unit is formed by integrating the telescopic body, the first opening/closing valve, and the second opening/closing valve, a driving unit is formed by integrating the pump and the motor, the telescopic unit and the driving unit are provided as separate bodies, the telescopic body of the telescopic unit is interposed between a truck of a railway vehicle and a center pin provided on a vehicle body, and the driving unit is disposed on an opposite side relative to the telescopic body across the center pin.

10. An actuator, comprising:

a telescopic body having a cylinder, a piston inserted into the cylinder to be free to slide, a rod that is inserted into the cylinder and connected to the piston, and a rod side chamber and a piston side chamber defined by the piston within the cylinder;

a tank;

a first opening/closing valve provided in a first passage that connects the rod side chamber to the piston side chamber;

a second opening/closing valve provided in a second passage that connects the piston side chamber to the tank;

a pump that supplies a working fluid to the rod side chamber;

a motor that drives the pump;

an exhaust passage that connects the rod side chamber to the tank; and a valve element provided in the exhaust passage, wherein a telescopic unit is formed by integrating the telescopic body, the first opening/closing valve, and the second opening/closing valve, a driving unit is formed by integrating the pump and the motor, the telescopic unit and the driving unit are provided as separate bodies, the telescopic body of the telescopic unit is interposed between a truck of a railway vehicle and a center pin provided on a vehicle body, and the driving unit is housed in the center pin.

\* \* \* \* \*